United States Patent [19]

Baadsgaard

[11] Patent Number: 5,375,559
[45] Date of Patent: Dec. 27, 1994

[54] PORTABLE LIVESTOCK FEEDER

[76] Inventor: Glen M. Baadsgaard, 7828 S. 2000 West, Spanish Fork, Utah 84660

[21] Appl. No.: 185,189

[22] Filed: Jan. 24, 1994

[51] Int. Cl.$^5$ ............................................. A01K 5/00
[52] U.S. Cl. ..................................................... 119/58
[58] Field of Search ....................... 119/58, 60, 65, 68, 119/69

[56] References Cited

U.S. PATENT DOCUMENTS

| | | | |
|---|---|---|---|
| 965,180 | 7/1910 | Hammel | 119/68 |
| 970,021 | 9/1910 | Dempsey | 119/68 |
| 4,457,264 | 7/1984 | Maier | 119/58 |
| 5,188,060 | 2/1993 | Johnson | 119/58 |

Primary Examiner—Gene Mancene
Assistant Examiner—Thomas Price
Attorney, Agent, or Firm—K. S. Cornaby

[57] ABSTRACT

A portable folding feeder for livestock having a vertically disposed back panel adapted to be secured to a vertical support wall when in use, and has a pair of side mounted doors swingably attached to either side of the back panel. A bottom flexible panel of cloth, leather or the like is mounted on the bottom of the feeder and can be folded upwardly into the feeder when not in use. A grate is provided for holding feed for the animals and is rotatably attached at the bottom of the back panel and drops forward to secure itself to both side doors when in use.

3 Claims, 3 Drawing Sheets

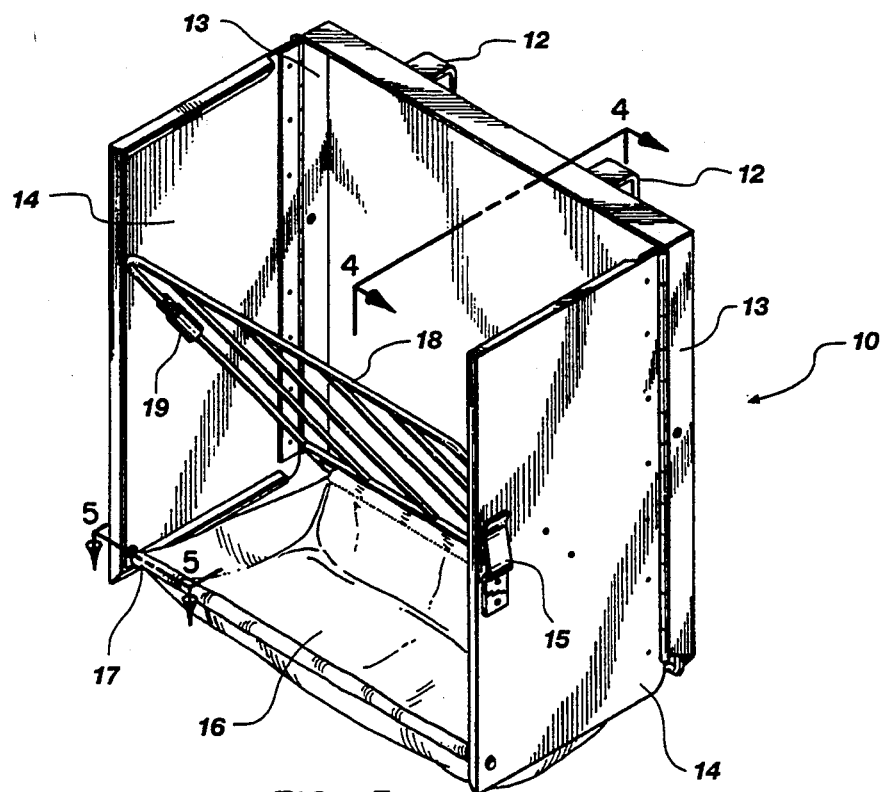
FIG. 3
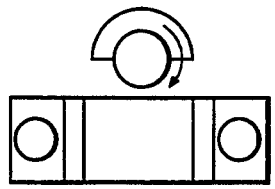
FIG. 5A
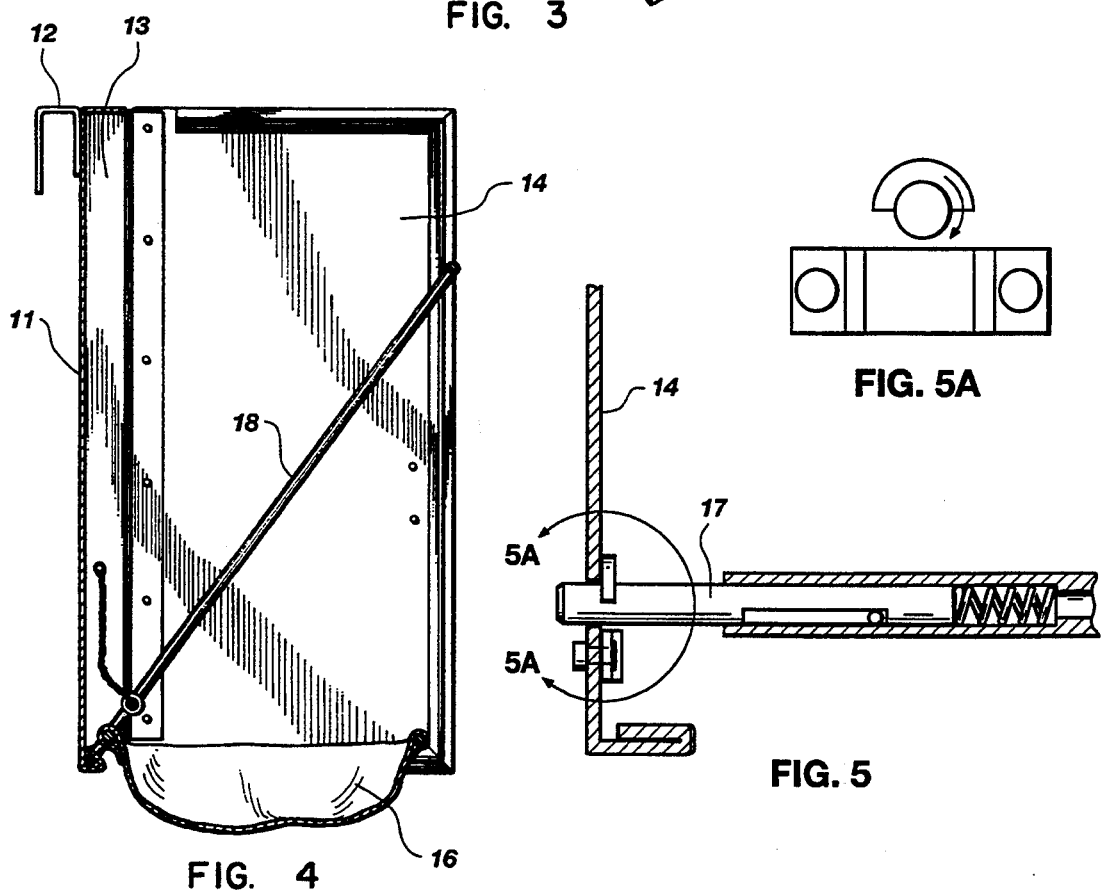
FIG. 4
FIG. 5

PORTABLE LIVESTOCK FEEDER

FIELD OF INVENTION

This invention relates to a portable feeder for use in feeding various types of grains and hay to livestock.

BACKGROUND OF THE INVENTION

It has long been desirable to have portable livestock feeders which are transportable in a folded state to preserve space, such as when livestock are being moved or are away from a stable, corral or other permanent feeding location. A variety of portable feeders have been developed for this use, but all share two major drawbacks to successful practical use. One is excessive weight due to a number of metal parts and elements coupled with rods, bolts and other heavy locking mechanisms needed for the particular design to hold the feeders open and functional. A second reason is the amount of time necessary to assemble the prior art portable feeders for use, and then dismantle the feeders for transport. In many instances, when livestock are on the move, every moment is valuable, and a livestock owner does not have the luxury to spend excessive amounts of time assembling portable feeders for immediate use.

In many cases, such portable feeders are best mounted on the side of a horse trailer or other livestock moving vehicle. The feeder must be capable of being folded out for immediate use, without having to assemble the feeder using rods, bolts, nuts and other time-consuming assembly mechanisms.

It was therefore an object of this invention to provide a portable, folding feeder for livestock which is light and easily folded out with no loose or easily-lost parts.

SUMMARY OF THE INVENTION

The objectives of the invention are met with a folding portable feeder having a solid panel vertical back member, a pair of swing-out side members attached to either side of the back member and a flexible bottom member for holding granular feed to be fed to the livestock. A grate is movably attached to the back panel and can be swung forward and secured to the open side members by means of a pair of catches secured to the side members, The grate holds other types of feed for the animals above the flexible bottom member.

THE DRAWINGS

A preferred embodiment of the invention is illustrated in the accompanying drawings, in which:

FIG. 3 is a perspective view of the feeder in a fully open position;

FIG. 4 is a side elevational section of the feeder taken along Line 4—4 of FIG. 3;

FIG. 5 is a sectional view of the locking mechanism for the cloth bottom taken along line 5—5 of FIG. 3;

FIG. 8 is a sectional view of the grate locking mechanism taken within Line 8—8 of

DETAILED DESCRIPTION OF PREFERRED EMBODIMENT

Figure 1:
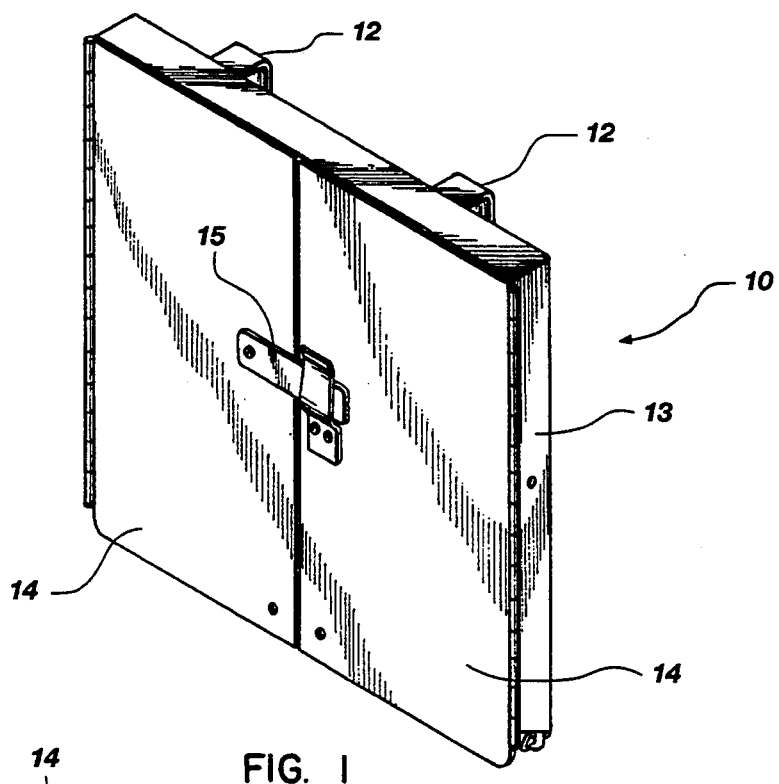
FIG. 1 is a perspective view of the feeder in a closed position.
Figure 2:
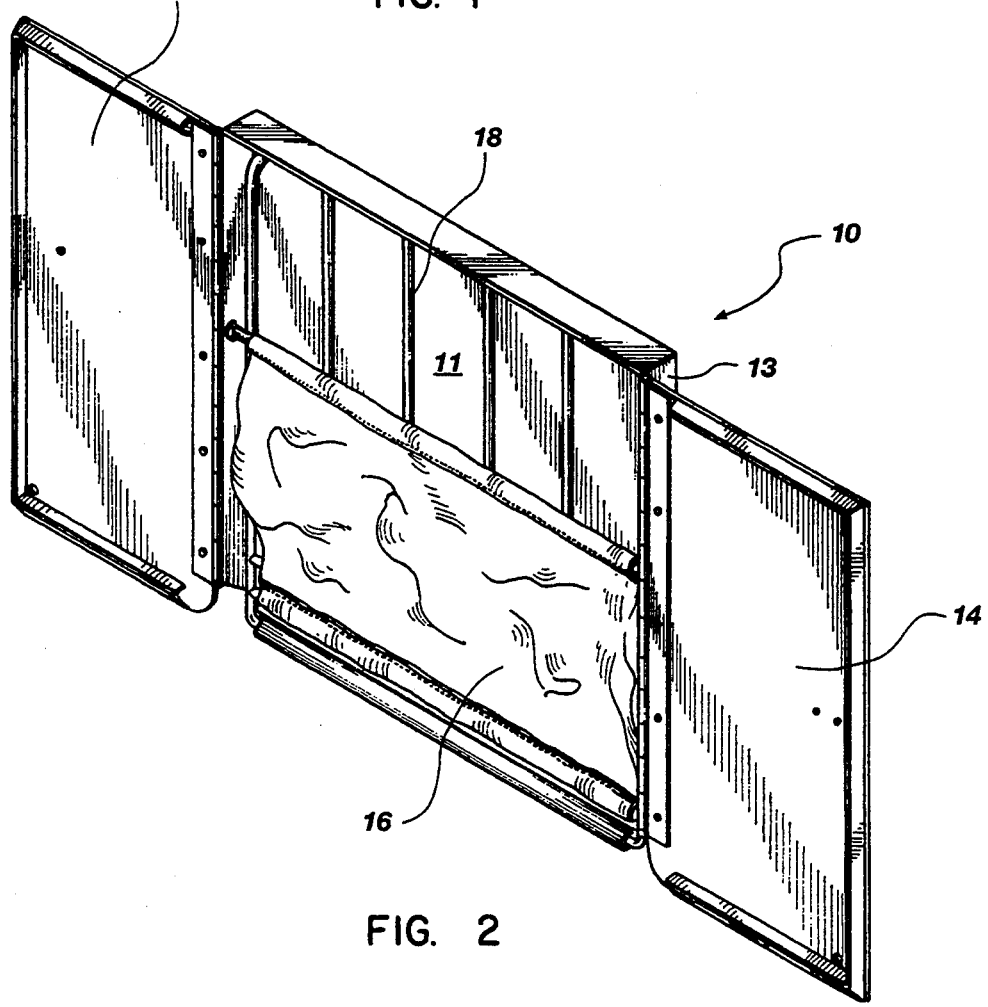
FIG. 2 is a perspective view of the feeder in a partially open position.
Figure 6:
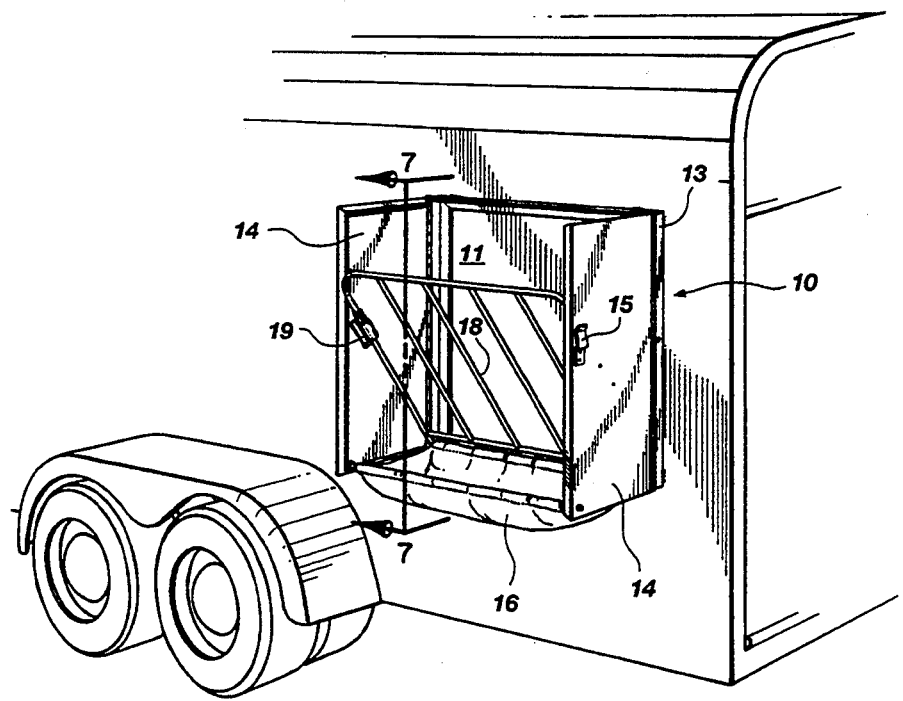
FIG. 6 is a perspective view of the open feeder shown attached to the side of a horse trailer.
Figure 7:
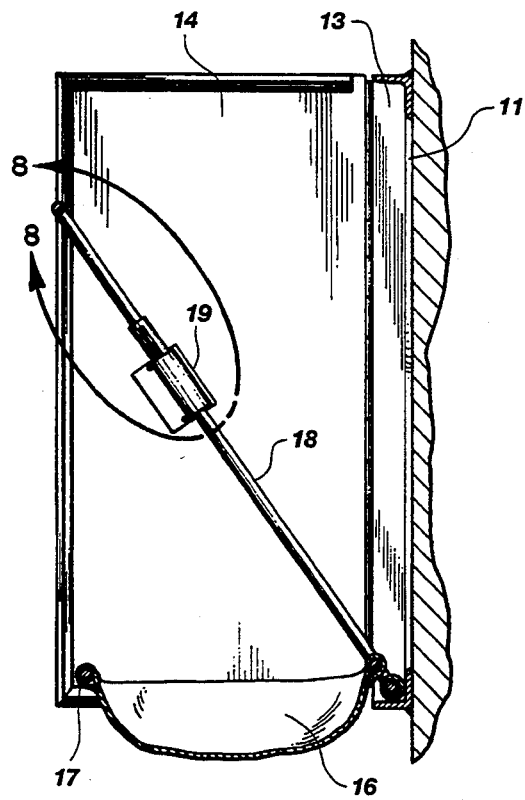
FIG. 7 is a side elevational section of the feeder taken along Line 7—7 of FIG. 6.

As shown in the attached drawings, a feeder 10 of the invention has a rear panel 11 adapted for mounting on a vertical surface when in use. Rear panel 11 has attachment means, which in this embodiment constitutes a pair of hooks 12 thereon for hanging the feeder 10 on a vertical wall, as shown in FIG. 6. Rear panel 11 also has a pair of forwardly extending mounting strips 13 for use in hingedly mounting a respective pair of side-opening doors 14 thereon. Side doors 14 are provided with a locking mechanism 15 for securing the doors in a locked position when folded for storage or travel.

A cloth or leather bottom panel 16 is secured to the back panel 11 and has a depression therein to hold loose feed such as grains for the livestock. As shown in FIG. 5, bottom panel 16 is secured to the pair of side doors 14 when the feeder is open by bottom panel securing means which in this embodiment constitutes a spring-loaded rod 17 extending through a folded-over section of the outer end of the bottom panel 16 and further extending at both ends through apertures in the side panel 14 to hold the side panel 14 open for use and to hold bottom, flexible panel 16 in its downward open position to hold animal feed.

Figure 8:
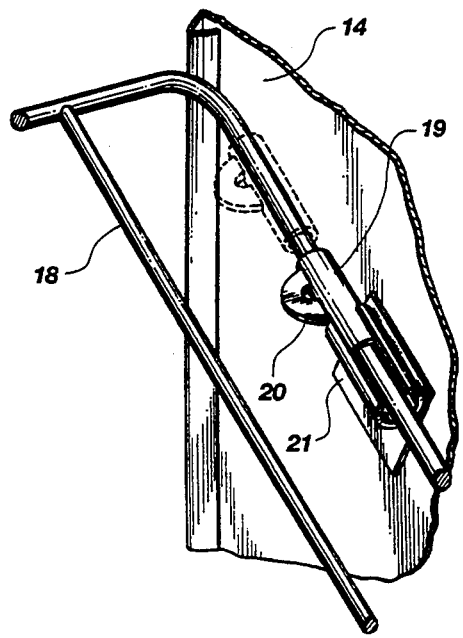

A feed holding grate 18 is rotatably attached at its rearward edge to rear panel 11 and can rotate forwardly at an acute angle with the rear panel 11 to hold feed such as alfalfa and grasses. Grate 18 is held in the downward, acute angle position by means of an engagement mechanism 19 secured to the inner sides of both respective side doors 14. FIG. 8 shows the preferred embodiment of the engagement mechanism 19 which has a slidable locking key 20 secured to grate 18 for locking grate 18 to a receiving device 21 secured to side wall 14.

While this invention has been described and illustrated herein with respect to preferred embodiments, it is understood that alternative embodiments and substantial equivalents are included within the scope of the invention as defined by the appended claims.

I claim:

1. A portable livestock feeder having in combination:
   A rear panel having a pair of forwardly extending side strips mounted on either vertical side of the rear panel;
   A pair of side doors movably mounted on either respective side of said rear panel side strips;
   A flexible bottom panel having a rear side which is flexibly attached to the rear panel and adapted to be folded upwardly against said rear panel;
   A feed grate having a rear side which is rotatably attached to the rear panel for swinging forward at an acute angle;
   A pair of engagement mechanisms attached on either respective side door for securing the feed grate in a feeding position;
   A bottom panel securing means attached to the bottom panel along its leading edge for securing the bottom panel to the respective side doors in an open locked position for use; and
   An attachment means on the rear panel for attaching the feeder to a vertical surface.

2. A portable livestock feeder as set forth in claim 1, wherein the engagement mechanism for each side door comprises a slidable locking key attached to the feed grate and a respective receiving device secured to each side door for receiving and engaging the locking key.

3. A portable livestock feeder as set forth in claim 1, wherein the bottom panel securing means comprises a spring-loaded rod extending through a folded-over section of the bottom panel to project laterally from both sides of the bottom panel adapted to engage respective apertures in each side door to hold the bottom panel in an open and locked position for use.

* * * * *